Aug. 29, 1967

S. O. RODESEIKE 3,339,031

METAL PROTECTED VOLTAGE CONDUCTOR FOR RAPID
TRANSIT ELECTRIFICATION

Filed Sept. 29, 1964

INVENTOR.
SIGURD O. RODESEIKE
BY
OSTROLENK, FABER, GERB & SOFFEN
ATTORNEYS

Aug. 29, 1967
S. O. RODESEIKE
3,339,031
METAL PROTECTED VOLTAGE CONDUCTOR FOR RAPID TRANSIT ELECTRIFICATION
Filed Sept. 29, 1964
3 Sheets-Sheet 2
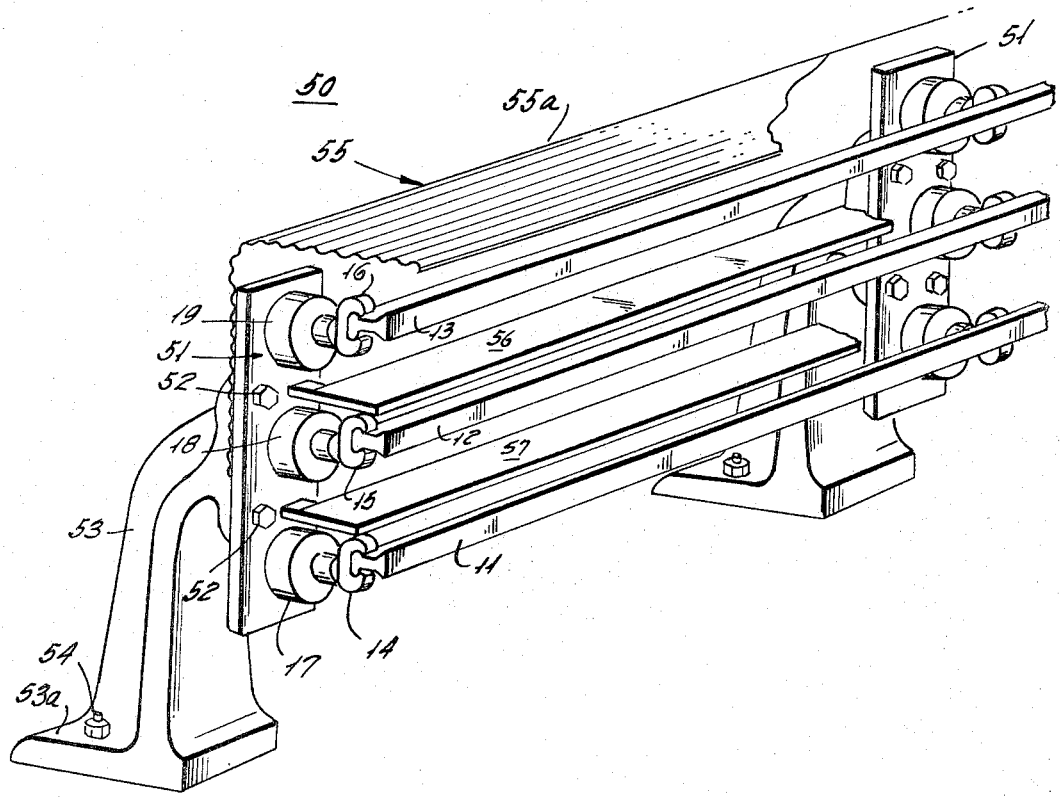
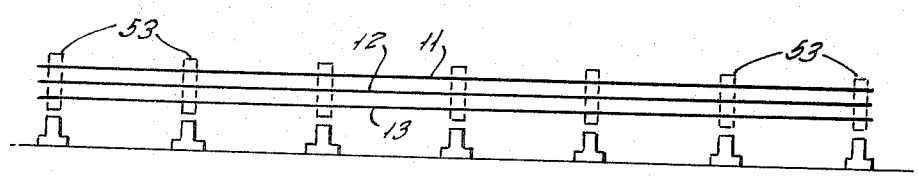
INVENTOR.
SIGURD O. RODESEIKE
BY
OSTROLENK, FABER, GERB & SOFFEN
ATTORNEYS

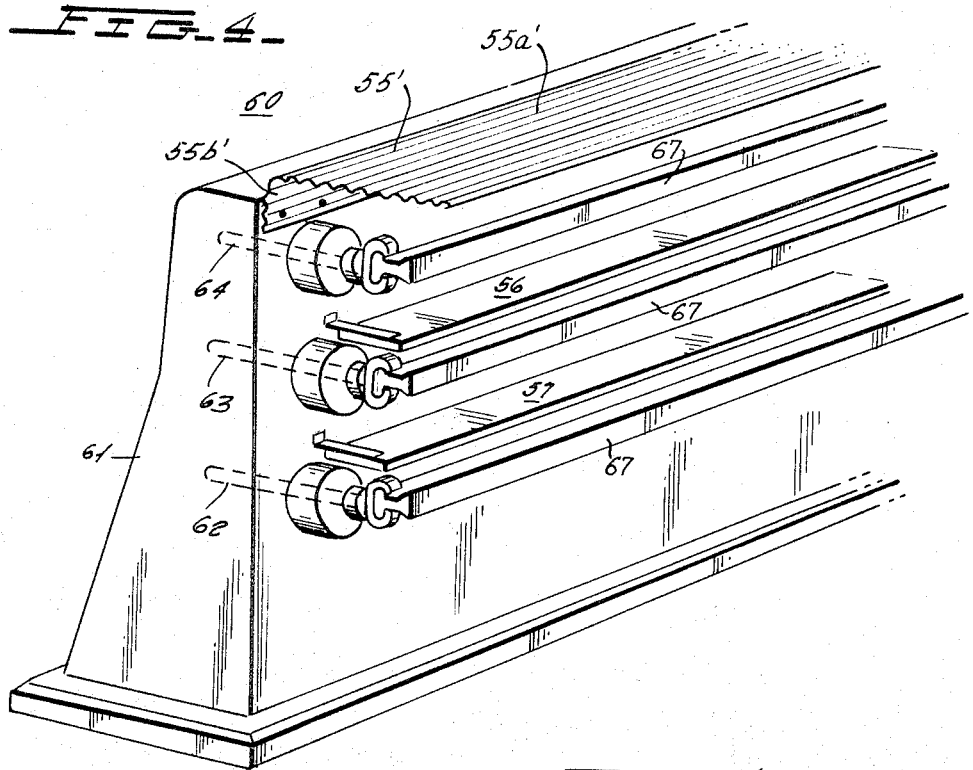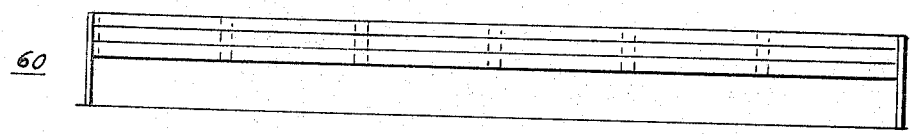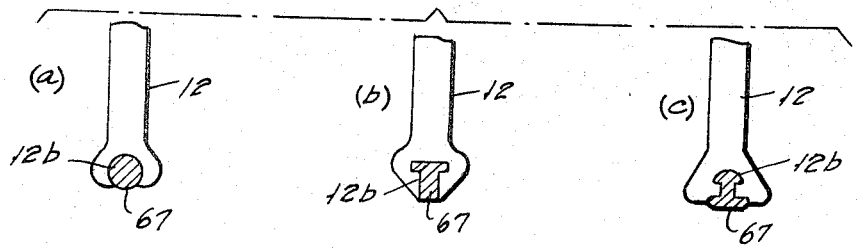

United States Patent Office 3,339,031
Patented Aug. 29, 1967

3,339,031
METAL PROTECTED VOLTAGE CONDUCTOR FOR RAPID TRANSIT ELECTRIFICATION
Sigurd O. Rodeseike, Greensburg, Pa., assignor to I-T-E Circuit Breaker Company, Philadelphia, Pa., a corporation of Pennsylvania
Filed Sept. 29, 1964, Ser. No. 400,081
5 Claims. (Cl. 191—30)

The instant invention relates to a power distribution system and more particularly to a three-phase A.C. power distribution bus assembly for use as a third rail in which the bus bars of the three-phase system are protected by a metallic cover.

The use of electrical power for transit systems is a well developed concept. One typical example of an electrified transit network is the subway system in which the cars of the system much resemble railway cars in that they move along rails (usually two) and are further provided with what is commonly referred to as a "third rail" to which D.C. power is provided. The power is coupled to the railway car propelling system by means of a brake shoe which makes sliding contact with the rail substantially continuously during the travel of the railway or transit car. Systems of this nature are typically found in large cities and are located either underground or on elevated platforms and are typically designed to travel at speeds on the order of 35 miles per hour.

Recently, much effort has been placed into the development of similar transit systems with the modification being that such transit systems are to be used to service regions covering many miles and are further designed so as to be able to travel at speeds of greater than 75 miles per hour with the capability of rapid acceleration to reach the desired traveling speeds of 75 miles per hour, or greater.

Transit systems of this general type thereby require power distribution buses of lengths as long as the run of the transit system which may, for example, be as long as 75 miles.

In order to avoid large power losses over bus distribution runs of such great length, and further in order to provide more efficient operation of the transit system cars, it is desirable to provide a "third rail" power distribution arrangement capable of providing three phase A.C. power to the transit cars. Such a three-phase A.C. power distribution system acts to minimize losses and the driving means for the transit cars operate at greater efficiency through the use of motors powered by three-phase A.C.

It thereby becomes necessary to provide a three-phase A.C. power distribution bus arrangement in which the bus conductors are readily accessible to the transit car three-phase brake shoe system wherein the power bus distribution system provides safe, reliable operation, which is substantially unaffected by the influences of all weather conditions wherein the bus bars of the system are rigidly and reliably installed and wherein some measure of protection is afforded maintenance personnel who may have need to engage in activities of maintenance and/or repair in close proximity to the power distribution system.

It is also extremely important to minimize the low inductive reactance of the three-phase bus arrangement and to provide adequate protection against arc-over or fault current conditions as between the bus bars and any equipment within close proximity to the three-phase bus arrangement. It is also extremely significant to design a system which, in addition to providing all of the above features, may be fabricated at a minimum of expenditures in order to guarantee the economic feasibility of such a system.

The instant invention provides all of the above advantages in an assembly which is relatively low in raw material, fabrication and assembly costs, which is simple in design and which provides reliable operation.

The instant invention is comprised of a three-phase A.C. third rail system having a bus bar for each phase wherein the bus bars are suitably positioned and secured at spaced intervals from one another in close proximity to the rails of the rapid transit network. A metal protected shield is provided which substantially covers all of the bus bars, thereby protecting them from the elements and preventing any collection of moisture, dirt, rain, snow or other harmful elements. In addition thereto, the shroud or cover provides protection from accidental contact by personnel by virtue of the cover which is grounded and which substantially envelops the conductors to prevent physical contact with the conductors which would be other than deliberate.

As an alternative embodiment, the cover member which is metallic and hence conductive, may be formed so as to act both as the cover as well as a grounded bus in a grounded delta bus design for the rapid transit network. In this manner, even though the cover acts as one of the three phases, the grounding of this phase prevents any harm from accidental contact with the cover member by maintenance or other personnel since it is safely grounded. As an additional feature, the use of a metallic shield provides the triple functions of serving as the grounded bus in a three-phase grounded delta bus arrangement and further acting as the support means for positioning and supporting itself as well as the remaining bus bars of the three-phase system. The arrangement set forth herein provides a suitable bus distribution system for use at high voltages such as, for example, a 2400-volt three-phase A.C. system, having the characteristics of low reactive impedance values and low losses which is extremely advantageous in rapid transit networks of an extremely large size such as, for example, networks serving points separated by 75 miles or more.

It is therefore one object of the instant invention to provide a novel third rail system for use in rapid transit networks and the like and having a suitable metallic protecting shield.

Another object of the instant invention is to provide a novel third rail system for use in rapid transit networks and the like for providing three-phase A.C. power to the rapid transit network and having a metallic protective shield covering the third rail assembly to prevent accidental contact with the third rail assembly.

Another object of the instant invention is to provide a novel third rail assembly for use in rapid transit networks and the like comprising a bus bar assembly for providing three-phase A.C. power to the transit cars and further being provided with a metallic cover which protects the bus bars from accidental contact therewith.

Still another object of the instant invention is to provide a novel third rail assembly for use in rapid transit networks and the like comprising a bus assembly for providing three-phase A.C. power to the transit cars and having a metallic covering which acts as one bus of the three-phase bus assembly, as well as providing protection against accidental contact with the remaining bus bars of the third rail assembly.

These and other objects of the instant invention will become apparent when reading the accompanying description and drawings in which:

FIGURE 1 is a perspective view of one third rail assembly designed in accordance with the principles of the instant invention.

FIGURE 2 shows a perspective view of an alternative embodiment of the instant invention.

FIGURE 2a is a schematic diagram showing one means of electrically connecting the third rail assembly of FIGURE 2.

FIGURE 3 shows a perspective view of still another alternative embodiment of the instant invention.

FIGURE 3a shows a side view of the embodiment of FIGURE 3.

FIGURE 4 shows a perspective view of still another alternative embodiment of the instant invention.

FIGURE 4a shows a side view of the embodiment of FIGURE 4.

FIGURE 5 shows a detailed view of the bus bars employed in the embodiments of FIGURES 1–4.

Referring now to the drawings, FIGURE 1 shows one three-phase A.C. third rail assembly 10, designed in accordance with the principles of the instant invention and which is comprised of bus bars 11–13 which are formed of a conductive material having a high current carrying capacity. Each of the conductors has a configuration forming first and second grooves 11a–13a and 11b–13b which are adapted to receive and be gripped by the pair of supporting arms 14a–16a and 14b–16b, respectively, with the ends of these arms resting in the grooves 11a, 11b–13a, 13b, respectively. The pairs of supporting arms are, in turn, secured to insulators 17–19 respectively, which in turn are rigidly secured to metallic shield member 20 by fastening means 21. The metallic shield 20, in turn, is rigidly secured to a supporting bracket assembly comprised of a vertically aligned I-beam 21 having a diagonally aligned arm 22 secured thereto by fastening means 23. Arm 22 is preferably an L-beam having a second L-beam 24 secured thereto by fastening means 25 so as to support the L-beam 24 substantially in a horizontal direction. The protective metal shield 20 is secured to L-beam 24 by means of the fastening members 26.

Power may be coupled to the bus bars 11–13 through a cable means 27 having conductors 27a–27c which may be connected to the bus bars 11–13, respectively, in any suitable manner in order to couple power from a three-phase energy source (not shown) to the three-phase bus bar system 11–13.

The I-beam 21 may be mounted to any suitable surface such as, for example, a concrete surface, by any suitable fastening arrangement.

The protective shield (metallic) 20 is suitably grounded through the structural support members 21, 22 and 24 and, having a substantially C-shaped cross-section, acts as a suitable shield or cover for the bus bars 11–13, protecting the bus bars against the accumulation of foreign elements, such as dirt or dust particles, moisture, rain, snow and the like. The manner in which the bus bars 11–13 are suitably enveloped by the metallic shield 20 protects operating and maintenance personnel against accidental contact with the bus bar arrangement. The bus bar assembly 10 of FIGURE 1 may preferably be formed in sections, each having a length of 40 feet, for example, with adjoining sections being spliced together in any well known manner.

The three-phase bus assembly 10 would normally be positioned adjacent and substantially parallel to the rails of the rapid transit network with the shoes of the transit cars making sliding contact with the underside of the respective bus bars 11–13. If desired, it is possible to support the assembly 10 in such a manner that the bus bars 11–13 which all lie substantially in a plane, may be oriented, this plane being vertically positioned in order to adequately protect maintenance personnel against accidental contact with the bus bars. The top arm of the metallic shield may be extended in the manner shown by the dotted line portion 20b so as to form a protective cover over the bus bars and to be slightly curved so as to substantially protect maintenance personnel against accidental contact with the bus bars. It should be noted that the L-brackets 22 and 24 should be aligned in such a way as to position and support the bus bars 11 and 13 in such a vertical alignment.

FIGURE 2 shows an alternative embodiment to the arrangement of FIGURE 1 in which the three-phase third rail assembly employs the metal protective shield as one bus bar of the assembly. In the embodiment 30 of FIGURE 2 wherein like elements to the assembly of FIGURE 1 are designated with identical numerals, the assembly therein is comprised of bus bars 11 and 13 provided with grooves 11a–11b and 13a–13b so as to be suitably gripped and supported by the support brackets 31 and 32, respectively. These brackets being identical, only one will be described herein for purposes of simplicity. The bracket 31 is comprised of first and second members 33 and 34 which are held together by suitable fastening means 35. The lower extending arms of members 33 and 34 grip bus bar 11 in the grooves 11a and 11b, respectively, so as to adequately position and support the bus bar 11. Sandwiched between members 33 and 34 is a rigid, metallic member 36 having continuous projections 36a which mate with the upper ends of members 33 and 34 so as to prevent any relative movement as between the elements 33, 34 and 36 in the upward or downward vertical direction.

The bus bar supporting assembly is rigidly secured to an insulator 17 by any suitable fastening means (not shown) with the upper end of insulator member 17 being rigidly secured to the meallic shield 37 by means of the fastening members 21. Depending upon the rigidity and strength requirements of the assembly 30, the support arrangements 31 and 32 are arranged at spaced intervals along each assembly section with the distance between the spaced brackets being determined by the strength and rigidity requirements of the bus bars.

As can be seen from FIGURE 2, the metallic shield 37 acts as a cover over the bus bars 11 and 13 is provided with downwardly directed sides 37a and 37b to further envelop the bus bars. The top side central portion of the metal shield 37 is provided with a continuous groove 37c extending along its entire length which is adapted to receive and make sliding engagement with one shoe extending from the rapid transit car. The remaining bus bars 11 and 13 would make contact with the remaining two shoes extending from the transit car to complete the three-phase connection between the third rail and the transit car. Optimum utilization of the third rail assembly 30 of FIGURE 2 would be derived by positioning assembly 30 between the tracks 38 of the transit network upon which the transit cars ride. Only short sections of the tracks 38 are shown for purposes of clarity.

The central portion of the metallic shield 37 is provided with a downwardly extending vertically aligned segment 37d which flares out at its bottom to form the flanges 37e and 37f to form a base support for the metallic shield 37. The base support may be secured between the tracks 38 in any suitable manner.

The electrical connection of the assembly 30 is shown in schematic form in FIGURE 2a wherein phase a is the bus bar 11, phase c is the bus bar 13 and phase b is the metal protective shield 37. The power sources 39 represent the voltage arrangement of a grounded delta bus system. As can be seen from the schematic of FIGURE 2a, the phase b is connected to ground at 40 so as to form a grounded delta bus design. With the metal protective shield 37 being connected so as to be constantly at ground potential, accidental contact with shield 37 by maintenance or other personnel will in no way be harmful. In addition thereto, the configuration of metallic shield 37 protects maintenance personnel against accidental contact with the ungrounded bus bars 11 and 13. The metallic shield configuration 37 further acts to eliminate one bus conductor by serving the dual function of providing support for the entire assembly 30, while making sliding contact with one of the shoes (not shown) extending from beneath the rapid transit car which rides upon the rails 38. Typical lengths of the assembly 30 may, for example, be forty feet, with adjacent ends of sections being coupled in any well known manner. The metallic shield 37 may readily be formed through an extrusion process, thereby greatly simplifying the cost of raw materials and fabrication of the assembly, in addition to giving a neat, compact appearance.

Another alternative embodiment of a third rail assembly is the assembly 50 of FIGURE 3 which is comprised of bus bars 11, 12 and 13, which all lie substantially in a plane extending in the vertical direction. Each bus bar is positioned and supported by a support member 14–16 respectively, which grips its associated bus bar in the manner shown. Each support member, in turn, is rigidly secured to an insulator 17–19, respectively, which in turn is rigidly secured to a metallic base plate 51. Insulators 17–19 electrically insulate the bus bars from one another as well as from base plate 51.

The vertically aligned base plate 51 is secured by fastening means 52 to a rigid, metal support member 53, having a base portion 53a which may be fastened to any sort of surface by fastening members 54. The fastening members 52 rigidly secure the base plate 51 to the metal support 53. The metal supports 53, two of which are shown in FIGURE 3 and a plurality of which are shown in FIGURE 3a, are arranged at spaced intervals, the length of each interval being determined by the mechanical rigidity required for the bus bars 11–13.

A substantially L-shaped metallic shield 55 is sandwiched between metal supports 53 and vertical base plates 51 so as to substantially shield the top and one side of the bus bar arrangement. The top side 55a of metallic shield 55 extends a predetermined distance beyond the right-hand edges of bus bars 11–13 in order to shield these members from the elements, and further to protect maintenance and other personnel against making accidental contact with the bus bars 11–13. The metallic shield is suitably grounded through the metal supports 53 so that contact with the shield will have no harmful effects.

In order to provide further suitable insulation between adjacent bus bars, insulating barriers 56 and 57 are provided, which barriers are horizontally aligned between adjacent bus bars at spaced intervals along one edge thereof to the base plates 51.

Typical sections of assembly 50 are formed in perhaps 40-foot lengths with the ends of adjacent sections being coupled in any suitable manner.

FIGURES 4 and 4a show an alternative arrangement to that shown in FIGURES 3 and 3a wherein the metal supports 53 of FIGURE 3 and 3a are replaced by a rigid concrete support or barrier 61 wherein the bus conductors are rigidly secured to the concrete support 61 by means of stud bolts 62–64 respectively. Due to the insulation properties of the concrete support and due to the fact that the concrete support runs the entire length of the bus assembly as opposed to being arranged at spaced intervals in the manner of the supports 53, this enables the use of a metallic shield 55' which has a relatively short vertically aligned portion 55b' with the horizontally aligned portion 55a' being substantially identical to the section 55a shown in FIGURE 3. Insulating barriers 56 and 57 are provided in the arrangement of FIGURE 4 and are substantially similar in design and function to the barriers of FIGURE 3. Preferably the assmbly 60 of FIGURE 4 may be fabricated in perhaps 40-foot sections, as shown in FIGURE 4a, with the insulated support assemblies being positioned at spaced intervals along the section. The third rail assembly is preferably positioned along one side of the car rails and is designed to have the right-hand vertically aligned surfaces of the bus conductors being in sliding contact with the transit car shoes (not shown).

Since it is important that the shoes (not shown) of the transit cars make firm and continuous sliding contact with the vertically aligned surfaces of the bus bars 11–13, and due to the fact that this wiping or frictional engagement causes a high degree of wearing of the bus bar contact surfaces, it is desirable to provide a bus bar configuration having high abrasive resistance qualities. Since a bus bar formed of a suitable material having such qualities is relatively expensive as regards the cost of raw materials, it is preferred to employ a bus bar of the type shown in FIGURES 5a–5e. In each of these figures the cross-section of a single bus bar is shown therein, together with the contact tip insert which cooperates with the bus bar.

The contact tip arrangements of FIGURES 5a–5c may by typically formed by rolling the contact tips 67 into the configurations shown in FIGURES 5a–5c. While these configurations will yield rigid and hence reliable assemblies, the contact tips 67 are non-replaceable. FIGURES 5d and 5e show alternative arrangements for contact tips 67 wherein the contact tips may be replaced when they become worn. In the embodiment of FIGURE 5d, the bus bar 12 is flared at 12c and 12d toward its lower surface in order to receive the contact tip 67 which has a substantially C-shaped configuration. In the embodiment of FIGURE 5e the bus bar 12 is provided with a projection 12e which is substantially narrower than the portion immediately above so as to form the flared notches 12f and 12g for receiving the substantially C-shaped contact tip 67. The contact tip 67 embodiments of FIGURES 5d and 5e may also be rolled on to the associated bus bars 12 in the snap-on fashion and in the same respect, are easily removed and replaced so as to form a replaceable bus bar configuration.

It can therefore be seen that the instant invention provides a novel three-phase A.C. third rail system for powering the railway cars of a rapid transit system wherein a rigid, reliable structure is provided, which further includes a metallic shield for protecting the bus bars of the assembly against the elements and further protecting maintenance and other personnel against accidental contact with the live bus conductors.

Although there has been described a preferred embodiment of this novel invention, many variations and modifications will now be apparent to those skilled in the art. Therefore, this invention is to be limited, not by the specific disclosure herein, but only by the appended claims.

The embodiments of the invention in which an exclusive privilege or property is claimed are defined as follows:

1. A conductor assembly for providing three-phase A.C. power for electrification of rapid transit systems and the like comprising first and second conductors arranged in spaced parallel fashion and lying substantially in a common plane; metallic shield means for supporting said first and second conductors; the central portion of said metallic shield means having a substantially I-shaped cross-section; the lower end of said central portion having oppositely extending first and second arms forming a base for said shield means; the upper end of said central portion having oppositely extending third and fourth arms positioned above said first and second conductors for preventing accidental contact therewith; insulator means positioned along said shield means for securing said first and second conductors to the underside of said third and fourth arms.

2. A conductor assembly for providing three-phase A.C. power for electrification of rapid transit systems and the like comprising first and second conductors arranged in spaced parallel fashion and lying substantially in a common plane; metallic shield means for supporting said first and second conductors; the central portion of said metallic shield means having a substantially I-shaped cross-section; the lower end of said central portion having oppositely extending first and second arms forming a base for said shield means; the upper end of said central portion having oppositely extending third and fourth arms positioned above said first and second conductors for preventing accidental contact therewith; insulator means positioned along said shield means for securing said first and second conductors to the underside of said third and fourth arms; the top side of said metallic shield means having a groove positioned between said third and fourth arms being substantially parallel to said first and second conductors and adapted for use as the third conductor of the three-phase power assembly.

3. A conductor assembly for providing three-phase A.C. power electrification of rapid transit systems and the like comprising first and second conductors arranged in spaced parallel fashion and lying substantially in a common plane; metallic shield means for supporting said first and second conductors; the central portion of said metallic shield means having a substantially I-shaped cross-section; the lower end of said central portion having oppositely extending first and second arms forming a base for said shield means; the upper end of said central portion having oppositely extending third and fourth arms positioned above said first and second conductors for preventing accidental contact therewith; insulator means positioned along said shield means for securing said first and second conductors to the underside of said third and fourth arms; the top side of said metallic shield means having a groove positioned between said third and fourth arms being substantially parallel to said first and second conductors and adapted for use as the third conductor of the three-phase power assembly; said metallic shield being grounded.

4. A conductor assembly for providing three-phase A.C. power for electrification of rapid transit systems and the like comprising first and second conductors arranged in spaced parallel fashion and lying substantially in a common plane; metallic shield means for supporting said first and second conductors; the central portion of said metallic shield means having a substantially I-shaped cross-section; the lower end of said central portion having oppositely extending first and second arms forming a base for said shield means; the upper end of said central portion having oppositely extending third and fourth arms positioned above said first and second conductors for preventing accidental contact therewith; insulator means positioned along said shield means for securing said first and second conductors to the underside of said third and fourth arms; the top side of said metallic shield means having a groove positioned between said third and fourth arms being substantially parallel to said first and second conductors and adapted for use as the third conductor of the three-phase power assembly; said metallic shield being grounded; said conductor assembly being connected in a grounded-delta arrangement.

5. A conductor assembly for providing three-phase A.C. power for electrification of rapid transit systems and the like, comprising first and second conductors arranged in spaced parallel fashion and aligned substantially in a common plane; metallic shield means for supporting said first and said second conductors; a support for said metallic shield means; said support being adapted to be installed and itself being supported adjacent the ground in the vicinity of the tracks of the rapid transit system; said shield means having arms positioned above said first and said second conductor for preventing accidental contact therewith; insulator means positioned along said shield means for securing said first and said second conductors to the underside of said arms; said metallic shield means having a top side which is comprised of a conductor means substantially parallel to said first and said second conductors and which is adapted for use as the third conductor for the three-phase power assembly.

References Cited

UNITED STATES PATENTS

| | | | |
|---|---|---|---|
| 348,008 | 8/1886 | Harris | 191—30 |
| 451,379 | 4/1891 | Haines | 191—30 |
| 588,541 | 8/1897 | Walkins | 191—22 |
| 842,574 | 1/1907 | McCahon | 191—30 X |
| 921,508 | 5/1909 | Burgess | 191—30 |
| 952,004 | 3/1910 | Edwards | 191—30 |
| 1,623,920 | 4/1927 | Harris | 191—32 |
| 2,254,147 | 8/1941 | Horn | 191—32 X |
| 2,495,526 | 1/1950 | King | 191—23 |
| 2,675,434 | 4/1954 | Herrmann | 191—23 |
| 2,991,336 | 7/1961 | Shaw et al. | 191—30 X |

FOREIGN PATENTS

| | | |
|---|---|---|
| 1,013,001 | 4/1952 | France. |
| 70,654 | 7/1946 | Norway. |

ARTHUR L. LA POINT, *Primary Examiner.*

STANLEY T. KRAWCZEWICZ, *Examiner.*